A. L. BOWER.
TRUCK CONSTRUCTION AND INSULATION.
APPLICATION FILED NOV. 14, 1908.
1,036,552.
Patented Aug. 27, 1912.
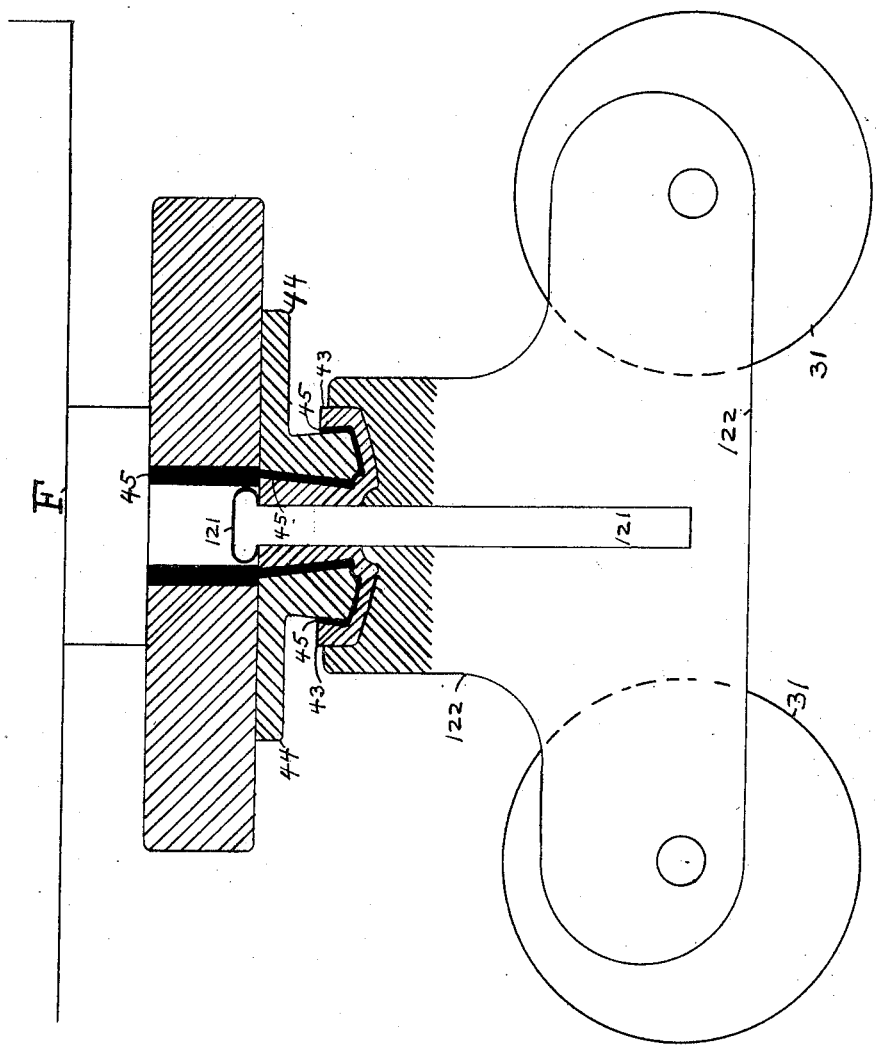
Witnesses
Elvina C. Hoch.
Mary L. Bower.
Inventor:
A. L. Bower.

UNITED STATES PATENT OFFICE.

ABRAM L. BOWER, OF BOYERTOWN, PENNSYLVANIA.

TRUCK CONSTRUCTION AND INSULATION.

1,036,552.     Specification of Letters Patent.     Patented Aug. 27, 1912.

Application filed November 14, 1908. Serial No. 462,730.

*To all whom it may concern:*

Be it known that I, ABRAM L. BOWER, a citizen of the United States, residing at Boyertown, in the county of Berks and State of Pennsylvania, have invented a new and useful Improvement in Truck Construction and Insulation, of which the following is a specification.

This invention relates to an improved insulation to be used in cab and other signal systems. This insulation is cast or molded instead of being bolted into place. This may be used to insulate the engine and tender, or to insulate a truck. A dove-tailed arrangement is used, giving great strength to the insulating devices.

The device is well adapted to be used in connection with the signal systems described in Patents Nos. 788513 and 832652 granted respectively to me on May 2nd, 1905 and Oct. 9th, 1906.

In the drawing is shown a portion of a car truck and car using the improved construction. The part F represents the car attachments supported on the truck. The extreme lower portion of this marked 44 is attached to the car. At 122 there is shown a member which is attached to the wheels 31, 31. A cup shaped part 43 bears against and turns on member 122. A cup shaped insulation 45 of rubber, fiber or other material insulates part 43 from member 44. A pin 121 extends through members 44 and 122 and part 43. The pin is completely insulated from the car F above and the member 44 by having the insulation 45 extended far enough up or by the use of suitable tubes or washers of insulation between the upper portion of the pin and the member 44.

In the construction of this device, it is preferred to insert the insulated material 45 in a softened condition between the parts and then apply sufficient pressure and heat if necessary to bring the parts into their proper position and retain them in position with the hardened insulating material.

This device may be modified to some extent without departing from the spirit and scope of the invention.

What I claim is:

1. A means for insulating a car from its wheels and supporting the car on the same, comprising a member attached to the car, a member attached to the wheels, a part bearing against one of said members and insulation between said part and the other member, said part and insulation being rigid with said last named member.

2. A means for insulating a car from its wheels and supporting the car on the same, comprising a member attached to the car, a member attached to the wheels, a part bearing against one of said members and insulation between said part and the other member, said part and insulation being rigid with said last named member, said insulation being coextensive with said part.

3. A means for insulating a car from its wheels and supporting the car on the same, comprising a member attached to the car, a member attached to the wheels, a part bearing against one of said members and insulation between said part and the other member, said part and insulation being rigid with said last named member, said insulation being cast or molded.

In witness whereof, I have signed my name to this specification in the presence of two subscribing witnesses, this thirteenth day of November, 1908.

ABRAM L. BOWER.

Witnesses:
HOWARD R. BOWER,
HENRY P. HELEWIG.

Copies of this patent may be obtained for five cents each, by addressing the "Commissioner of Patents, Washington, D. C."